(12) United States Patent
Popescu (10) Patent No.: US 6,487,097 B2
(45) Date of Patent: Nov. 26, 2002

(54) FEEDFORWARD CLAMPING APPLIED TO THE CONTROL VOLTAGE IN SWITCH MODE POWER SUPPLIES (SMPS)

(75) Inventor: Lucian Popescu, Burnaby (CA)

(73) Assignee: Altel Technology, Burnaby (CA)

( * ) Notice: Subject to any disclaimer, the term of this patent is extended or adjusted under 35 U.S.C. 154(b) by 18 days.

(21) Appl. No.: 09/802,723

(22) Filed: Mar. 12, 2001

(65) Prior Publication Data

US 2002/0000796 A1 Jan. 3, 2002

Related U.S. Application Data

(60) Provisional application No. 60/189,934, filed on Mar. 16, 2000.

(51) Int. Cl.[7] ............................................. H02M 7/122
(52) U.S. Cl. .................... 363/56.09; 323/285; 323/299; 361/18
(58) Field of Search ................................. 323/222, 282, 323/285, 299; 363/21.01, 21.04, 21.12, 55, 56.01, 56.09; 361/18

(56) References Cited

U.S. PATENT DOCUMENTS

| 4,837,495 | A | * | 6/1989 | Zansky | 323/222 |
| 5,717,322 | A | * | 2/1998 | Hawkes et al. | 323/283 |
| 5,952,817 | A | * | 9/1999 | Brewster et al. | 323/285 |

* cited by examiner

*Primary Examiner*—Jeffrey Sterrett (57) ABSTRACT

A method to dynamically clamp the feedback control voltage in DC—DC converters, with the purpose to limit the duty-cycle and to protect the magnetic components against saturation, over a wide range of input voltage conditions. The clamping level is function of input voltage and allows the design optimization of the magnetic components in the way of minimizing their size and is active only during transient events, when momentary open loop condition may occur.

4 Claims, 15 Drawing Sheets

FEEDFORWARD CLAMPING CIRCUIT BLOCK DIAGRAM (NON-ISOLATED)

FEEDFORWARD CLAMPING CIRCUIT BLOCK DIAGRAM
(INPUT ISOLATED FROM OUTPUT)

FEEDFORWARD CLAMPING APPLIED TO THE CONTROL VOLTAGE IN SWITCH MODE POWER SUPPLIES (SMPS)

CROSS-REFERENCE TO RELATED APPLICATIONS

U.S. Patent Documents

U.S. PATENT DOCUMENTS

| | | |
|---|---|---|
| 4,415,960 | 11/1983 | Clark, Jr. . . .363/21 |
| 4,546,421 | 10/1985 | Bello et al. . .363/21 |
| 4,809,150 | 02/1989 | Limuti et al. . .363/21 |
| 5,717,322 | 02/1998 | Hawkes et at. . .323/283 |

Other Publications

Robert Mammano, Applying the UCC3570 voltage-mode PWM controller to both off-line and DC/DC converter designs, Application Note U-150, Unitrode Applications Handbook 1997 VIPer100/SP, VIPer100A/ASP Application Note—Current Limitation Circuit example (Page 15/20), ST Microelectronics

BACKGROUND OF THE INVENTION

Figure 1:
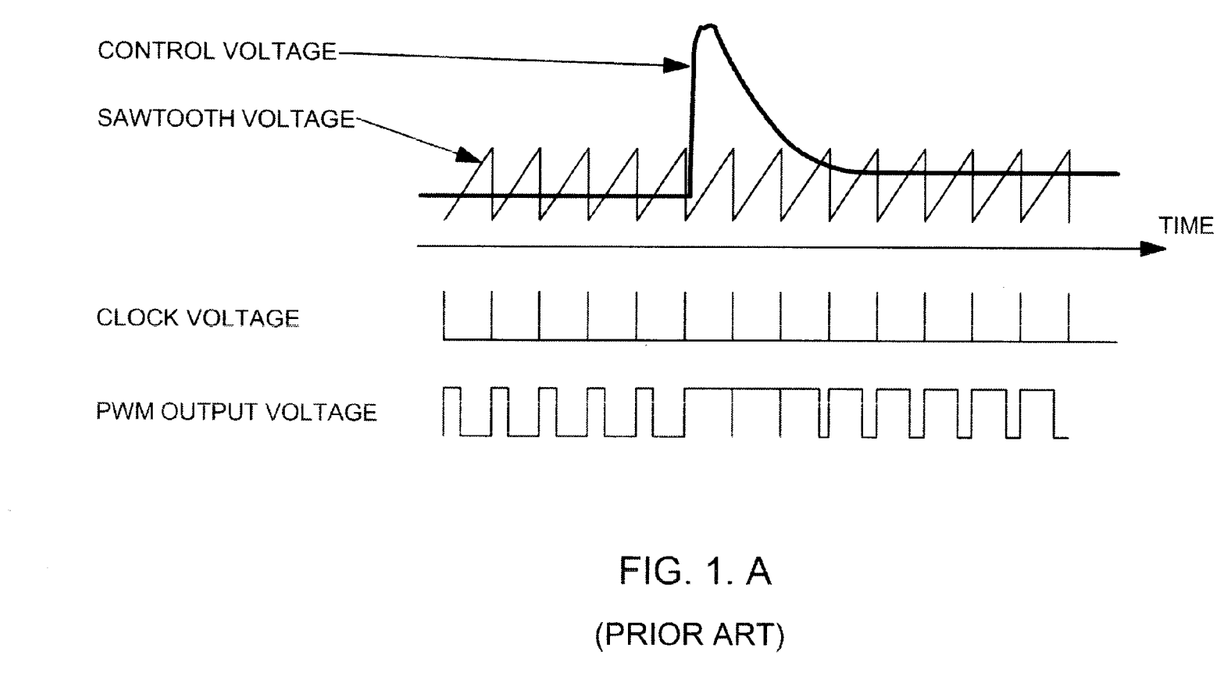
Figure 2:
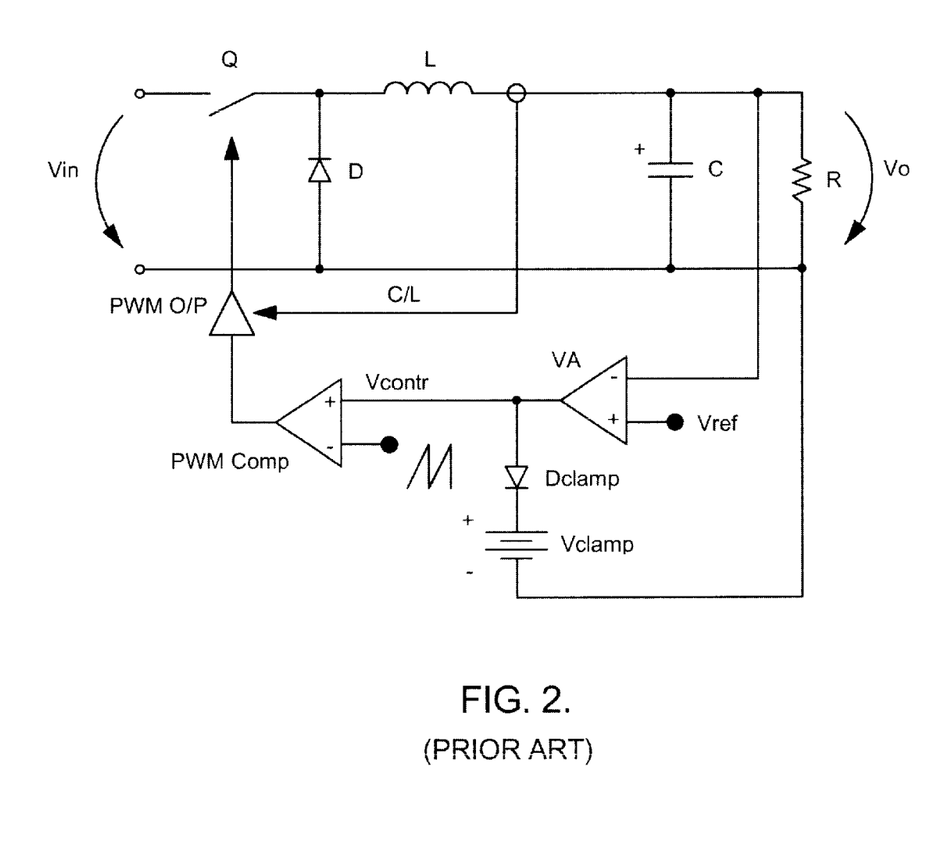
FIG. 2 is a schematic circuit diagram of a buck DC—DC converter having a fixed clamping circuit of the feedback control (prior art).

A DC—DC converter developed under any topology, with or without isolation between input and output, is using a control signal to adjust the duty-cycle and regulate the output against input or load variations. The control section may comprise different configurations: direct duty-cycle voltage-mode control, feed-forward voltage-mode control, peak current-mode control or average current-mode control. By combining these multitude of topologies (buck, boost, flyback, etc) with different control options, a big variety of DC—DC conversion solutions can be achieved, to suit particular applications requirements (size, output power, power dissipation, output noise, input or output voltages). However, all existing topologies have a common problem, when dealing with transient events, like start-up, sudden variation of input voltage or load. During this relatively short period of time, the feedback control loop behavior is critical and will translate on how fast and accurate the power supply is adapting to the new conditions. There are physical limitations to an ideal and instant response from the feedback control circuit. Energy levels previously stored in the output inductors and capacitors, in the control loop compensation capacitors are impossibly to change as fast as the external conditions may vary. Consequently, there is a momentary discrepancy between the actual and needed control value, usually triggering dumped oscillations, resulting in unwanted control overshoots. This momentary open loop condition is wrongly generating an abnormal high ON time, with additional stress at the level of the power switches and magnetic components. FIG. 1 shows how different control configurations typically handle a transient event. The solution to this problem is to oversize the power switch, to handle the increased peak current and to oversize the magnetic components (number of turns and/or magnetic cross-section area) to prevent saturation because of higher flux density. This may not be acceptable in some designs, where the size is an issue. A method to overcome this problem is illustrated in FIG. 2. It consists in limiting the duty-cycle to a maximum by clamping the control signal to a fixed level. The disadvantage of this technique is that for wide input voltage variation is corresponding a high variation of the duty cycle, according to the following transfer functions:

$V_o = V_{in} D (RT/2L)^{1/2}$ —For flyback topology (in discontinuous inductor current)

$V_o = V_{in} D/(1-D)$ —For flyback topology (in continuous inductor current)

$V_o = V_{in} D T_{OFF} R/2L$ —For buck topology (in discontinuous inductor current)

$V_o = V_{in} D$ —For buck topology (in continuous inductor current)

$V_o = V_{in} R D T_{OFF}/2L$ —For boost topology (in discontinuous inductor current)

$V_o = V_{in}/(1-D)$ —For boost topology (in continuous inductor current)

where:

$V_o$ = output voltage
$V_{in}$ = input voltage
$D = T_{ON}/T$ (duty cycle)
R = load resistance
T = switching period of time
$T_{ON}$ = period of time when the switch is ON
$T_{OFF}$ = period of time when the switch is OFF
L = inductance value of the inductor Generally emerging from the above transfer functions, for low input voltage corresponds high duty-cycle D (and control voltage) and vice-versa, if output voltage and current are constant. If fixed clamp is applied to control voltage (which determines duty-cycle D), for its maximum level (corresponding to low input voltage and full output power), this may not protect the magnetic cores from saturation if high input voltage and momentary overshoot of control voltage. Although this technique is limiting the overshoot of the feedback loop response, further improvements will be introduced by the invention presented below, conducting to further switches and magnetic components size optimization.

BRIEF SUMMARY OF THE INVENTION

This invention offers reliable protection against overcurrent in the main switches and/or saturation of the magnetic components (power transformer and/or inductors) in a DC—DC converter built under any topology, by using a feed-forward clamping circuit to limit the feedback control signal over a wide range of input voltage. The result is an increase of reliability and enables optimization of the main switches and magnetic components (power transformer and/or main inductor) in the way that minimizes their overall size. The protection is active only during transient events, when momentary open loop condition may occur.

BRIEF DESCRIPTION OF THE DRAWINGS

FIG. 1.A is showing the feedback control overshoot during a step load increase and resulting waveforms if direct duty-cycle voltage-mode control is used in a typical buck regulator.

FIG. 1.B is showing the feedback control overshoot during a step load increase and resulting waveforms if average current-mode control is used in a typical buck regulator.

FIG. 1.C is showing the feedback control overshoot during a step load increase and resulting waveforms if peak current-mode control is used in a typical buck regulator.

DETAILED DESCRIPTION OF THE INVENTION

As discussed when previously analyzed the prior art, momentary feedback open loop condition triggered by transient events may saturate the magnetic components and may destroy the main switches. To prevent this to happen, the magnetic components and/or the switches should be over-sized and/or the feedback should be designed to act faster and/or the output filter magnetics and capacitors should have smaller values in order to store less energy and to faster respond to the system changes. Any of these approaches have their drawbacks; the present document will not elaborate on these issues.

The present invention offers a better option, which is an adaptive feed-forward clamping circuit to limit the feedback control overshoot to an optimized level, function of the input voltage, protecting the circuit during transient conditions and not interfering with the system stability. This approach addresses the problem directly, limiting the main switches ON time in accordance with the specific input voltage level.

For a transformer, magnetic core saturation will occur if $V_{in}$ and $T_{ON}$ are generating a flux density level B in the core bigger than $B_s$, according to formula (1):

$$B = V_{in} T_{ON} / N_p A_e \quad (1)$$

where:
$B_s$=saturation flux density.
$N_p$=number of turns of primary of the transformer.
$V_{in}$=voltage across primary of the transformer.
$A_e$=cross-section area of the core.

For an inductor, the flux density level B is given by the formula (2):

$$B = I_{pk} L / N A_e \quad (2)$$

where:
$I_{pk}$=peak current developed in the inductor at the end of the ON time period
L=inductance value of the inductor
N=number of turns of the inductor
$A_e$=cross-section area of the magnetic core As transpiring from above formulas, the magnetic flux density level is in direct proportionality with the ON time and input voltage level. In order to prevent saturation, the combination of the two elements must be kept under control.

Figure 3:
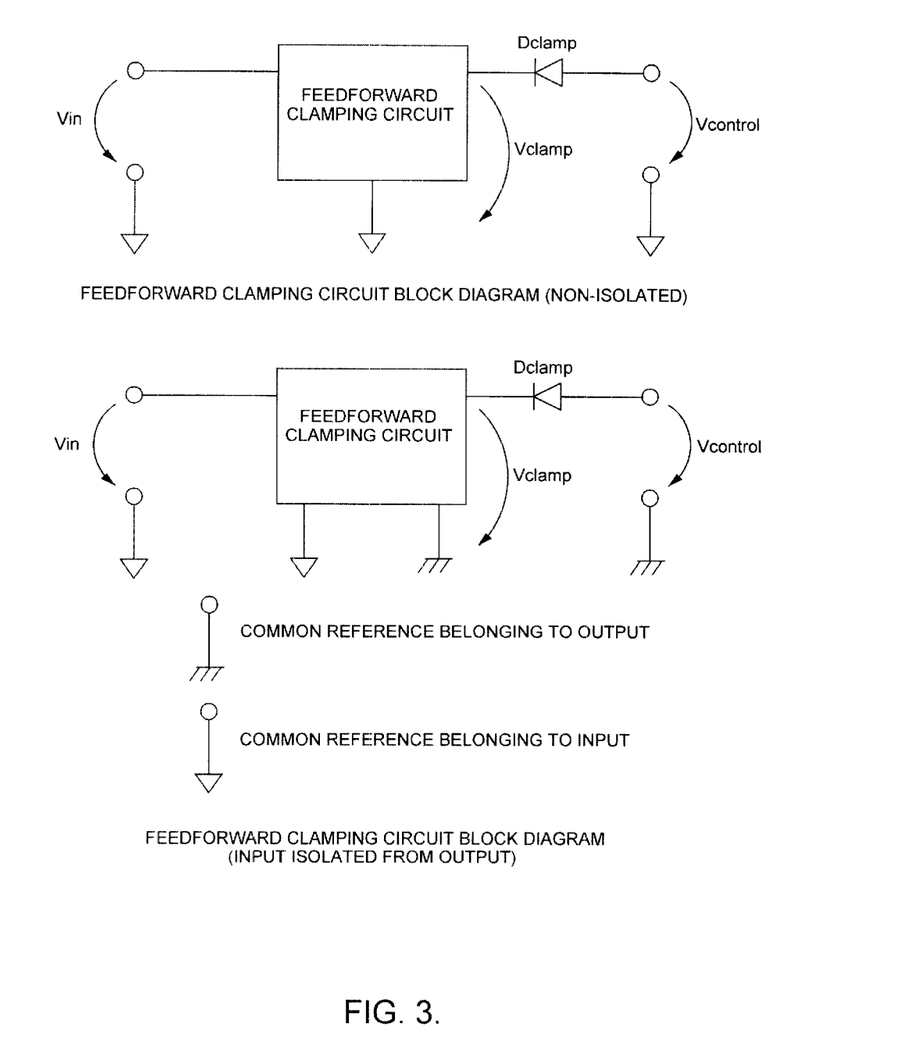
FIG. 3 is a functional block diagram of the invention.

FIG. 3 is a generalized, functional, block diagram of the adaptive feed-forward clamping circuit. The first block diagram addresses the non-isolated topologies and will be detailed in the first preferred embodiment (FIG. 4) and second preferred embodiment (FIG. 5). The second block diagram addresses the isolated topologies and will be detailed in the third preferred embodiment (FIG. 9) and fourth preferred embodiment (FIG. 10).

Figure 4:
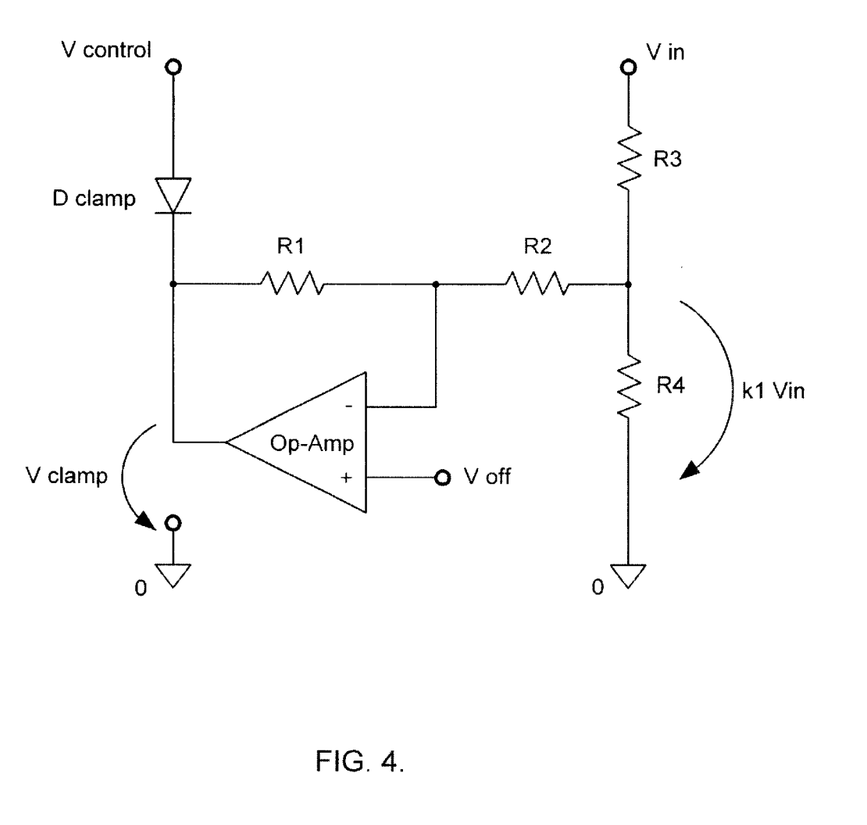
FIG. 4 is a schematic circuit diagram of the first preferred embodiment of the present invention.
Figure 5:
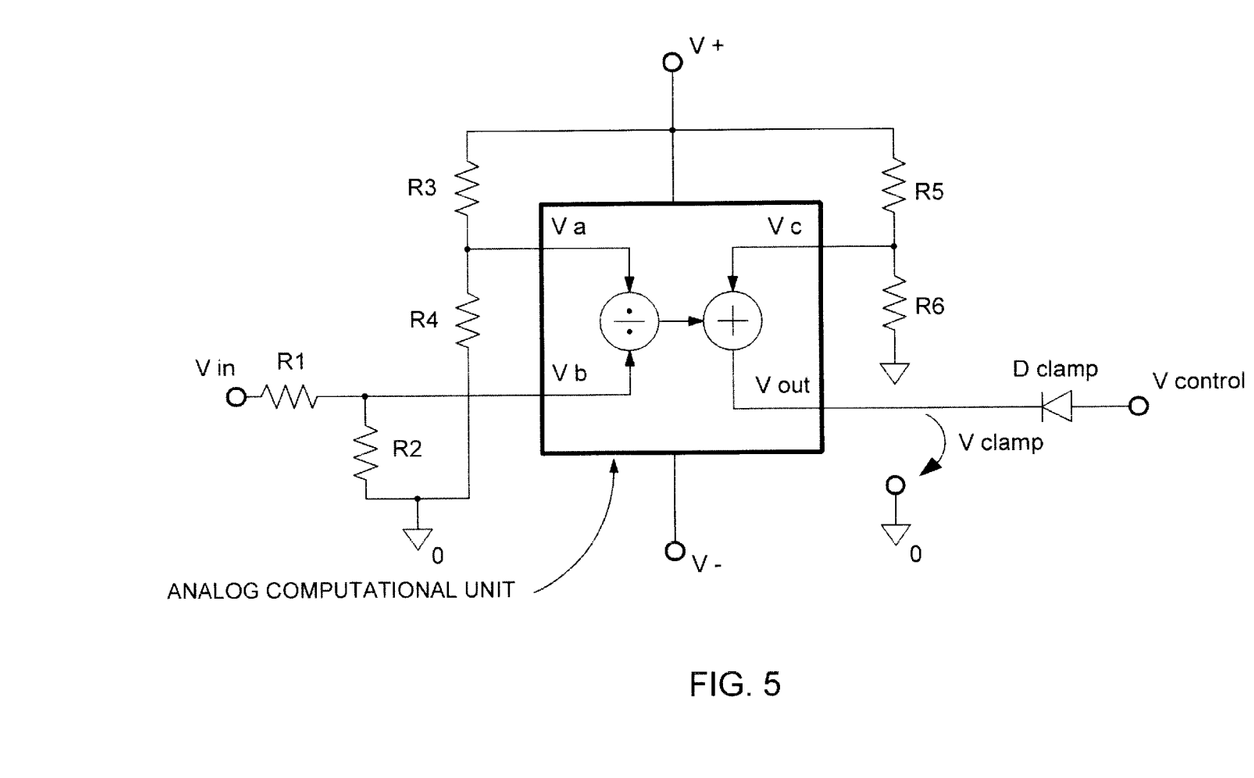
FIG. 5 is a schematic circuit diagram of a second preferred embodiment of the present invention.

FIG. 4 is the schematic circuit diagram of the first preferred embodiment. It uses an operational amplifier to generate $V_{clamp}$ from $V_{in}$ fed to its inverting input.

Further with reference to FIG. 4, the transfer function of this circuit is:

$$V_{clamp} = V_{off}(R_1+R_2)/R_2 - k_1 V_{in} R_1/R_2, \; V_{clamp} > V_{control} \quad (3)$$

where:

$$k_1 = R_4/(R_3+R_4)$$

In its general form, by replacing $V_{off}(R_1+R_2)/R_2$ with $V_{OFFSET}$ and $k_1 R_1/R_2$ with k, the transfer function is:

$$V_{clamp} = V_{OFFSET} - k V_{in}, \; V_{clamp} > V_{control} \text{ for any working conditions.} \quad (4)$$

where:
$V_{clamp}$=clamping voltage level
$V_{control}$=feedback control voltage level
k=constant parameter, depending with the particular SMPS solution adopted (topology, input voltage range, power requirements, control type)
$V_{in}$=input voltage
$V_{OFFSET}$=offset voltage, chosen upon the same criteria as the constant k As stated in formula (3) and (4), to ensure the clamping effect does not interfere with the control voltage in the steady-state regime, $V_{clamp}$ must always be bigger than $V_{control}$.

As observed from formula (4), $V_{clamp}$ decreases with $V_{in}$, consequently the maximum ON time and duty-cycle D that can occur during a transient event decreases with $V_{in}$. This is consistent with the invention's idea, to limit the product volt-second in order to do not saturate the core of the magnetic components.

FIG. 5 is the schematic circuit diagram of the second preferred embodiment. It uses an Analog Computational Unit to compute the clamping voltage from the input voltage level. Further with reference to FIG. 5, the transfer function of this circuit is:

$$V = k_3 V^+ + k_2 V^+/(k_1 V_{in}), \; V_{clamp} > V_{control} \quad (5)$$

where:

$$k_1 = R_2/(R_1+R_2), \; k_2 = R_4/(R_3+R_4)$$

and $$k_3 = R_6/(R_5+R_6)$$

In its general form, by replacing $k_3V^+$ with $V_{OFFSET}$ and $k_2V^+/k_1$ with k, the transfer function is:

$$V_{clamp} = V_{OFFSET} + k/V_{in}, V_{clamp} > V_{control} \text{ for any working conditions.} \quad (6)$$

As resulting from formula (5) and (6), $V_{clamp}$ is reverse proportional with $V_{in}$, consequently achieving the same goal as the first preferred embodiment.

Figure 6:
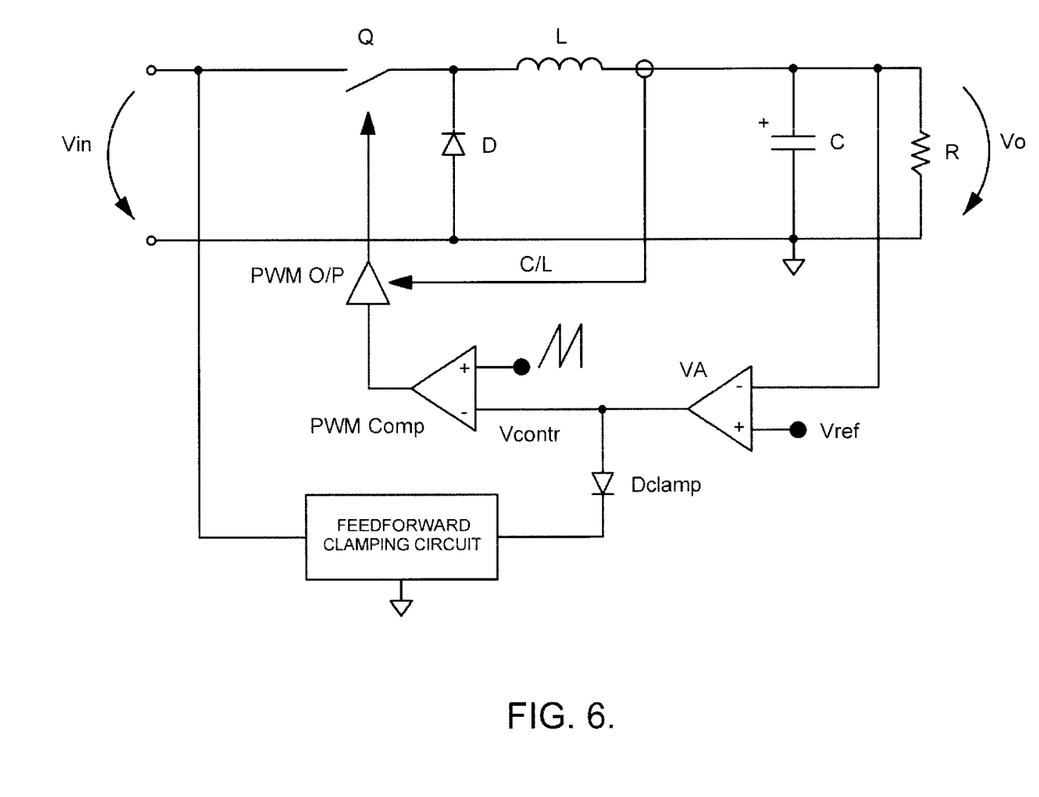
FIG. 6 is exemplifying where the first or second preferred embodiment will insert in the schematic of a typical non-isolated buck converter using direct duty-cycle voltage-mode control.

FIG. 6 shows a typical non-isolated buck converter schematic, having direct duty-cycle voltage mode control, using the feed-forward clamping circuit described as "first preferred embodiment" or circuit described as "second preferred embodiment" with the purpose described in the present invention to clamp the feedback control voltage by means of diode $D_{clamp}$ and consequently limiting the volt-second product applied to the magnetic components over a wide range of input voltages.

Figure 7:
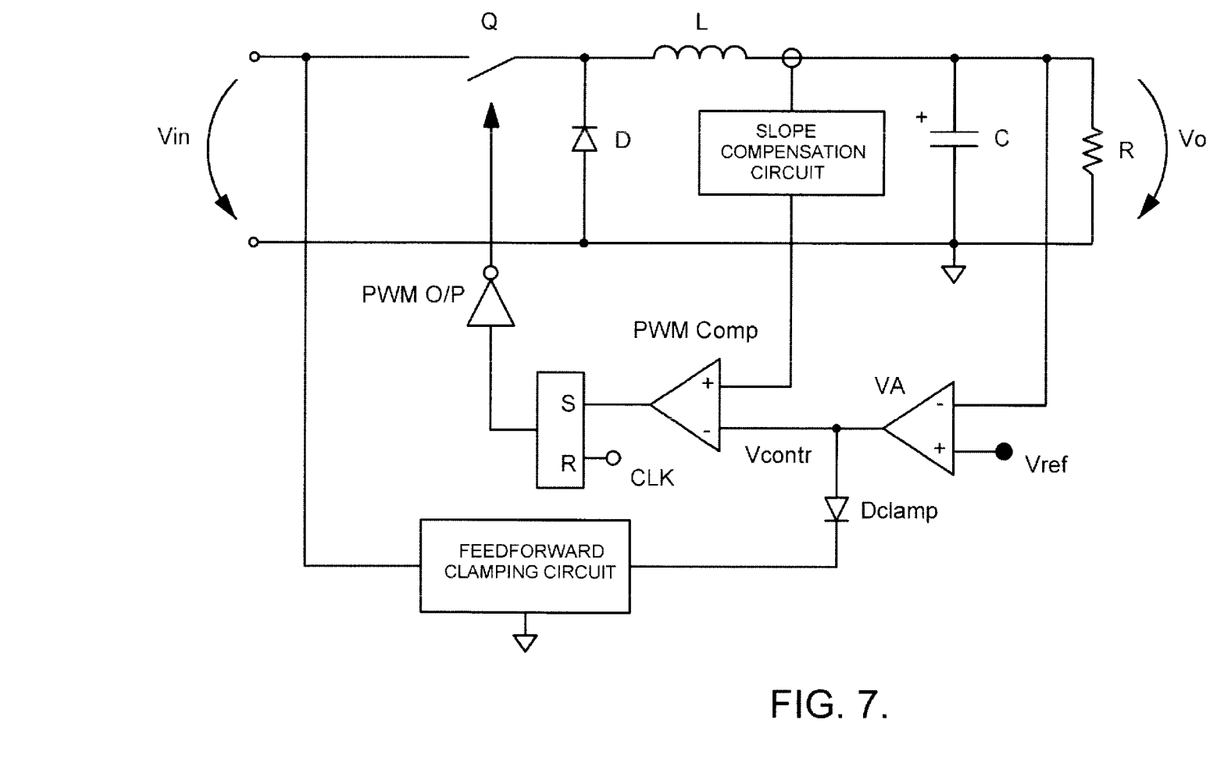
FIG. 7 is exemplifying where the first or second preferred embodiment will insert in the schematic of a typical non-isolated buck converter using peak current-mode control

FIG. 7 shows a typical non-isolated buck converter schematic, having peak current mode control, using the feed-forward clamping circuit described as "first preferred embodiment" or circuit described as "second preferred embodiment" with the purpose described in the present invention to clamp the feedback control voltage by means of diode $D_{clamp}$ and consequently limiting the volt-second product applied to the magnetic components over a wide range of input voltages.

Figure 8:
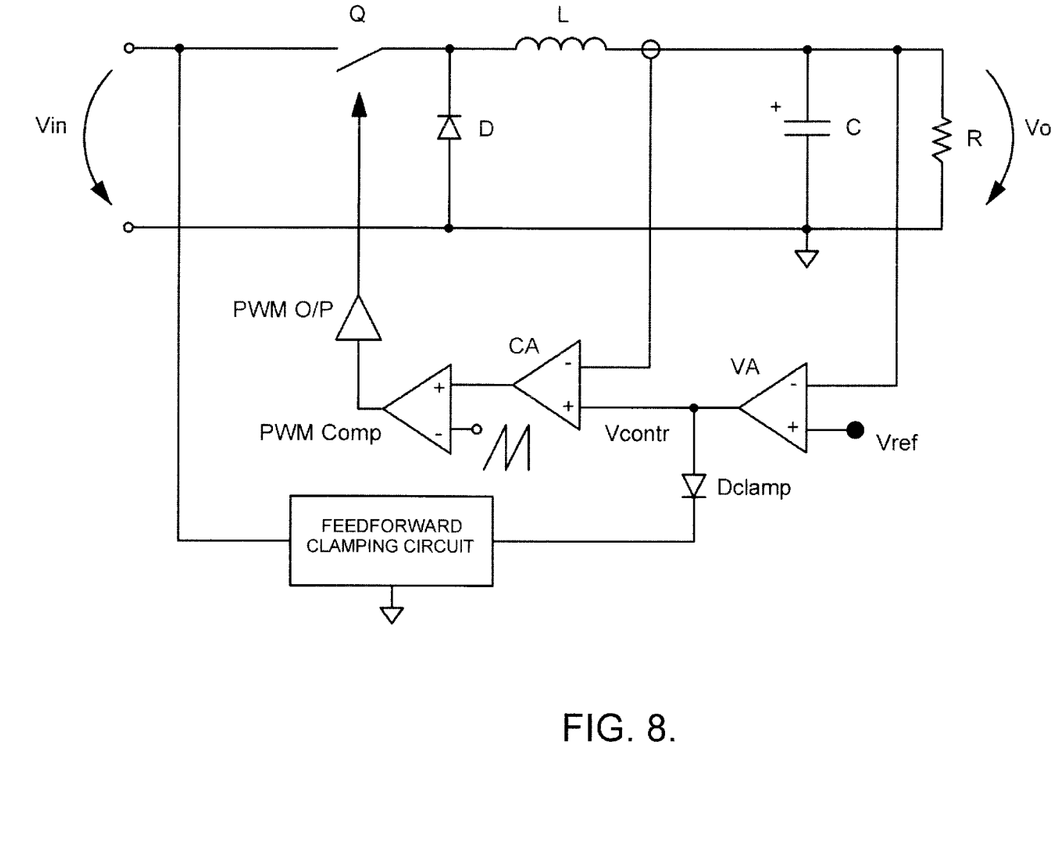
FIG. 8 is exemplifying where the first or second preferred embodiment will insert in the schematic of a typical non-isolated buck converter using average current-mode control.

FIG. 8 shows a typical non-isolated buck converter schematic, having average current mode control, using the feed-forward clamping circuit described as "first preferred embodiment" or circuit described as "second preferred embodiment" with the purpose described in the present invention to clamp the feedback control voltage by means of diode $D_{clamp}$ and consequently limiting the volt-second product applied to the magnetic components over a wide range of input voltages.

Figure 9:
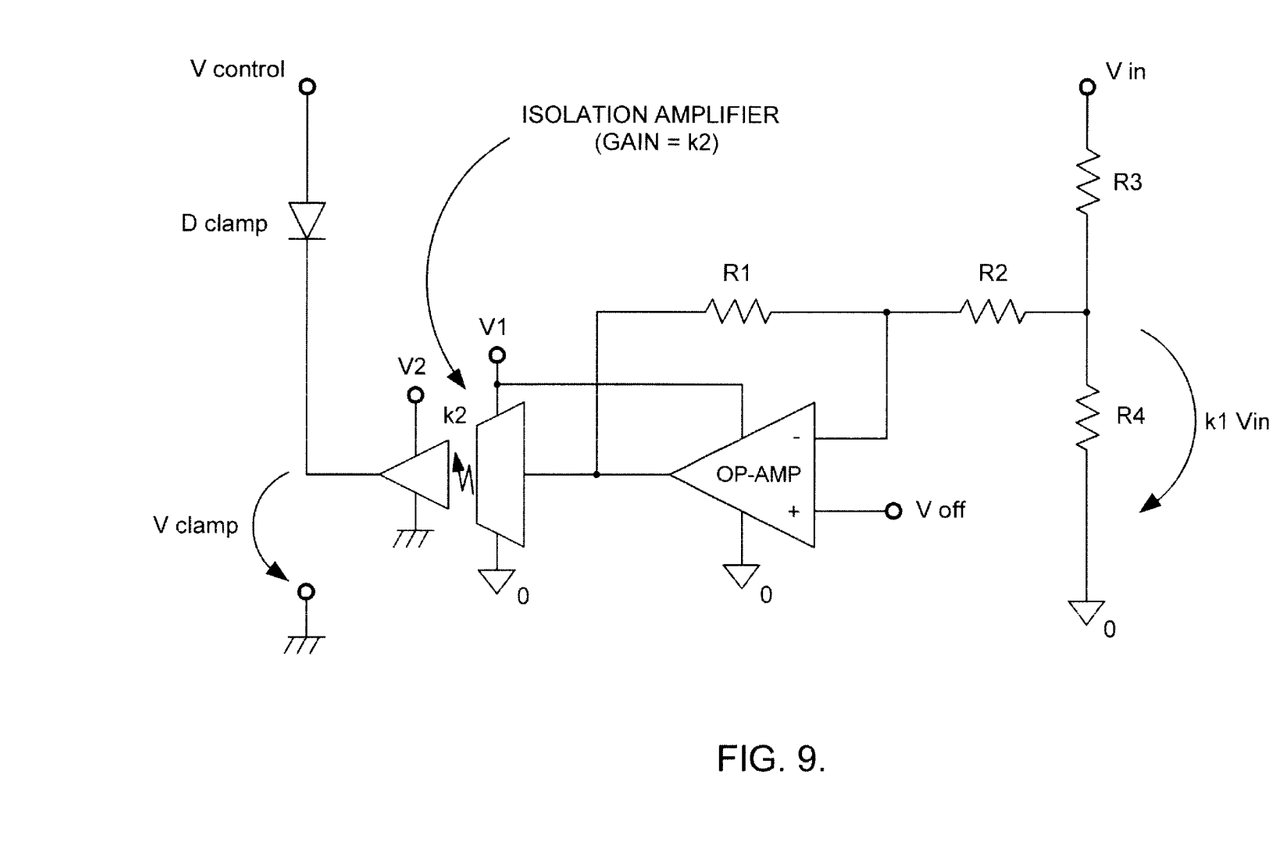
FIG. 9 is a schematic circuit diagram of the third preferred embodiment of the present invention.
Figure 10:
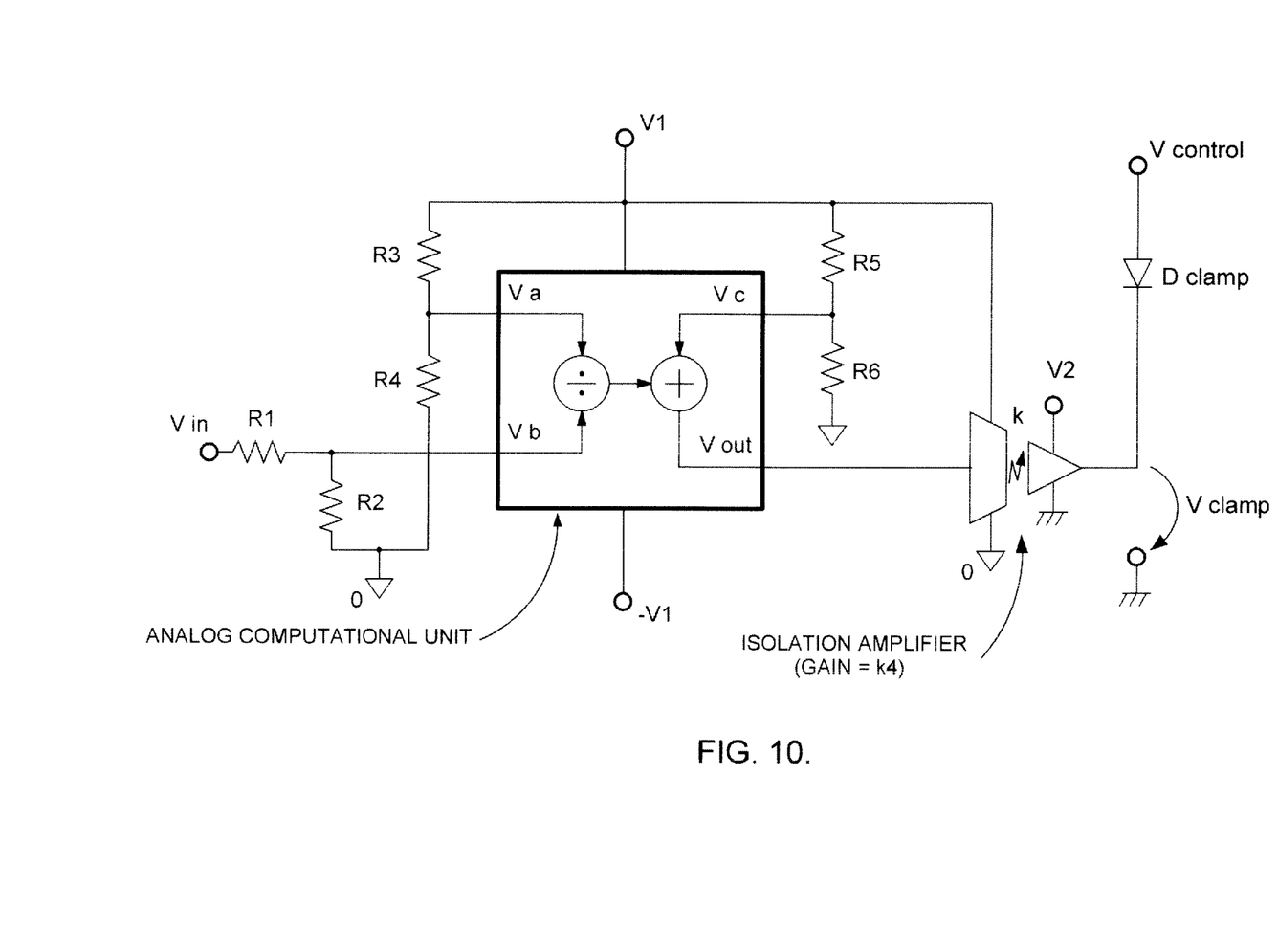
FIG. 10 is a schematic circuit diagram of the fourth preferred embodiment of the present invention.

FIG. 9 is a schematic circuit diagram of the third preferred embodiment of the present invention. It is similar with the first preferred embodiment, with the difference that uses an additional linear isolation amplifier with a gain $k_2$, to insure isolation between input and output.

Further with reference to FIG. 9, the transfer function of this circuit becomes:

$$V_{clamp} = k_2V_{off}(R_1+R_2)/R_2 - k_1k_2V_{in}R_1/R_2, V_{clamp} > V_{control} \quad (7)$$

where:

$$k_1 = R_4/(R_3+R_4)$$

$k_2$=linear isolation amplifier gain

In its general form, by replacing $k_2V_{off}(R_1+R_2)/R_2$ with $V_{OFFSET}$ and $k_1k_2R_1/R_2$ with k, the transfer function is:

$$V_{clamp} = V_{OFFSET} - kV_{in}, V_{clamp} > V_{control} \text{ for any working conditions.} \quad (8)$$

where:
   $V_{clamp}$=clamping voltage level
   $V_{control}$=feedback control voltage level
   k=constant parameter, depending with the particular SMPS solution adopted (topology, input voltage range, power requirements, control type)
   $V_{in}$=input voltage
   $V_{OFFSET}$=offset voltage, chosen upon the same criteria as the constant k FIG. 10 is a schematic circuit diagram of the fourth preferred embodiment of the present invention. It is similar with the second preferred embodiment, with the difference that uses an additional linear isolation amplifier with a gain $k_4$, to insure isolation between input and output.

Further with reference to FIG. 10, the transfer function of this circuit becomes:

$$V = k_3k_4V_1 + k_2k_4V_1/(k_1V_{in}), V_{clamp} > V_{control} \quad (9)$$

where:

$$k_1 = R_2/(R_1+R_2), k_2 = R_4/(R_3+R_4)$$

and $$k_3 = R_6/(R_5+R_6)$$

$k_4$=linear isolation amplifier gain

In its general form, by replacing $k_3k_4V_1$ with $V_{OFFSET}$ and $k_2k_4V_1/k_1$ with k, the transfer function is:

$$V_{clamp} = V_{OFFSET} + k/V_{in}, V_{clamp} > V_{control} \text{ for any working conditions.} \quad (10)$$

Figure 11:
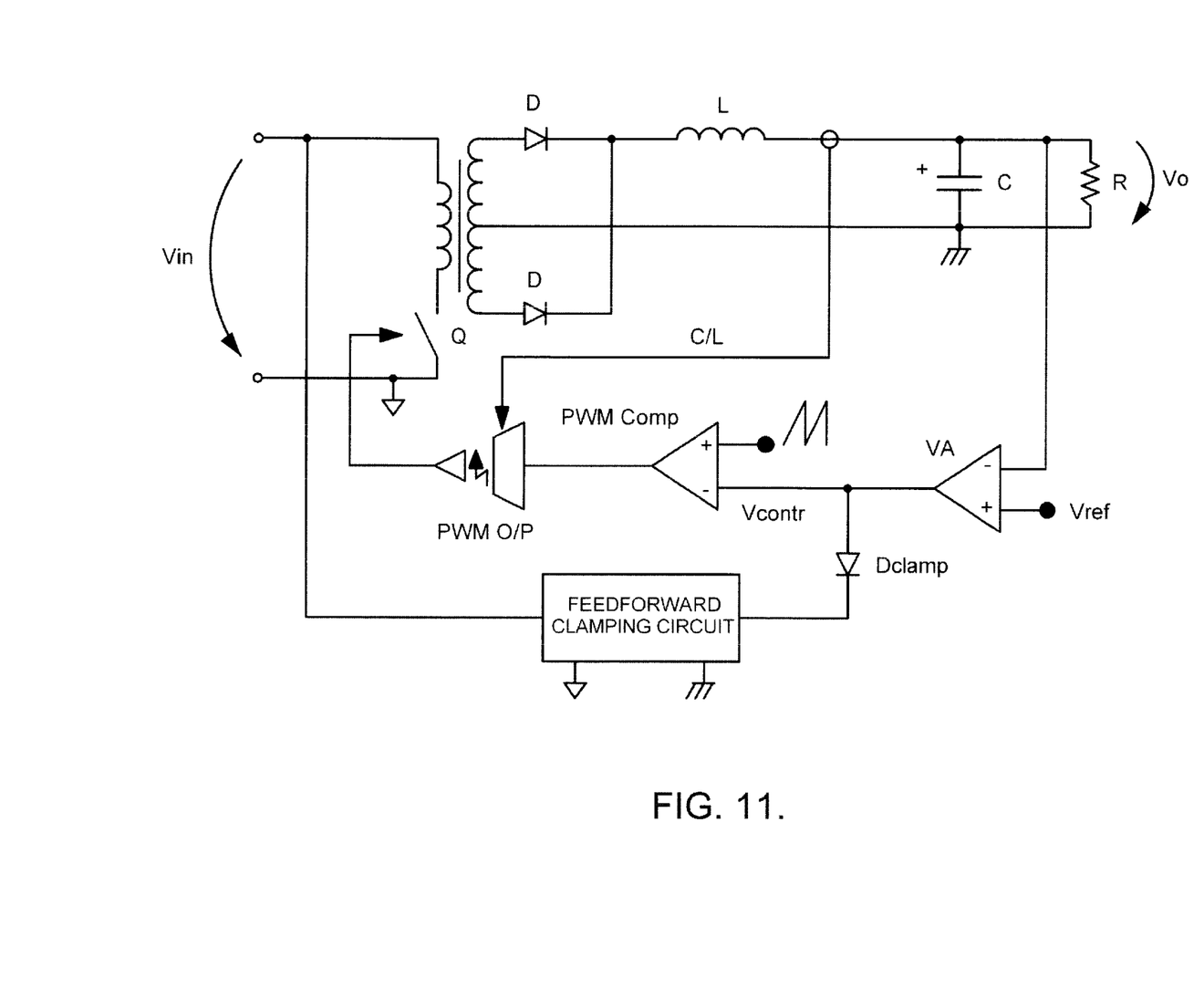
FIG. 11 is exemplifying where the third or fourth preferred embodiment will insert in the schematic of a typical isolated forward converter using direct duty-cycle voltage-mode control.

FIG. 11 shows a typical isolated forward converter schematic, having direct duty-cycle voltage mode control, using the feed-forward clamping circuit described as "third preferred embodiment" or circuit described as "fourth preferred embodiment" with the purpose described in the present invention to clamp the feedback control voltage by means of diode $D_{clamp}$ and consequently limiting the volt-second product applied to the magnetic components over a wide range of input voltages.

Figure 12:
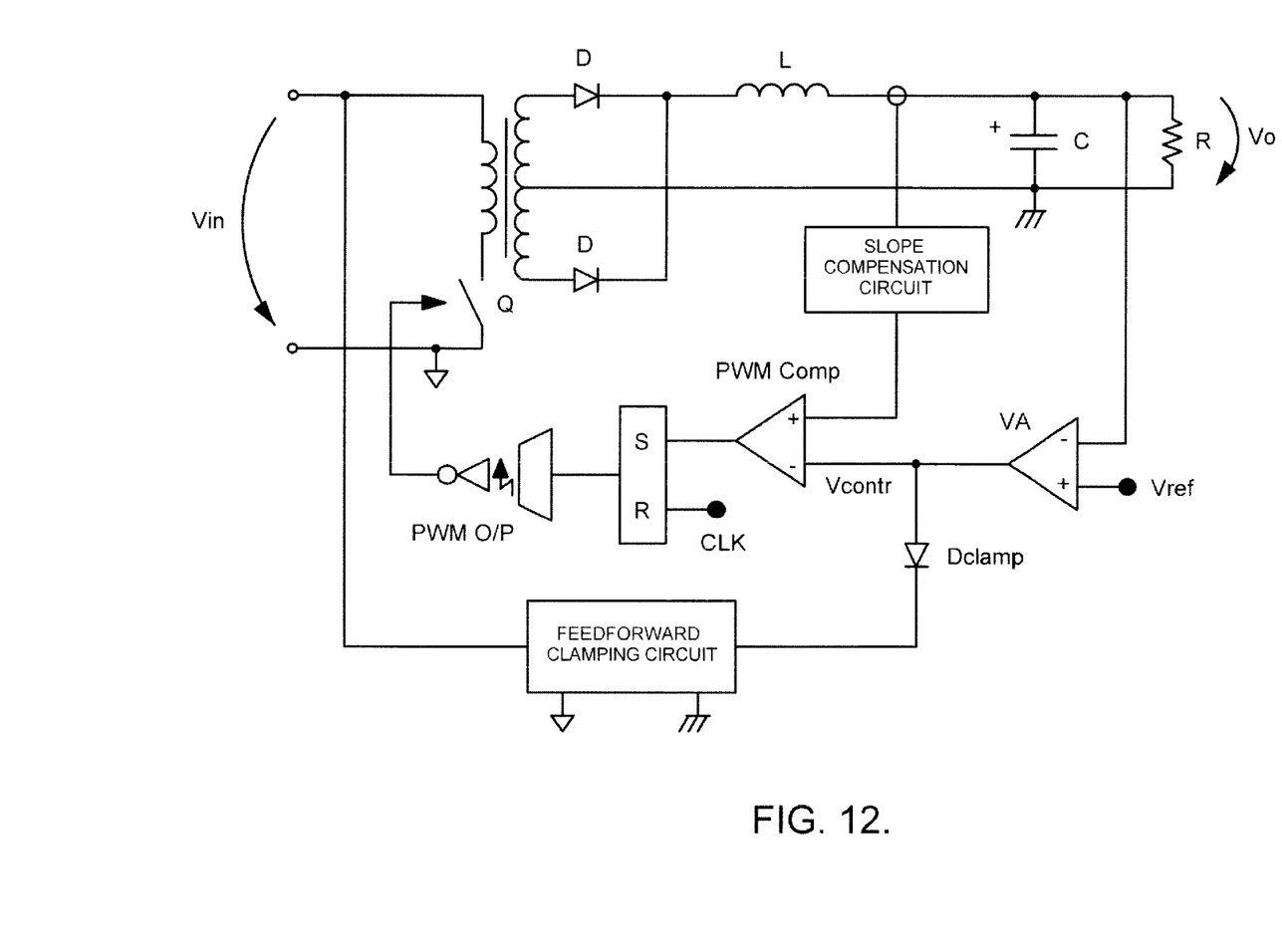
FIG. 12 is exemplifying where the third or fourth preferred embodiment will insert in the schematic of a typical isolated forward converter using peak current-mode control.

FIG. 12 shows a typical isolated forward converter schematic, having peak current mode control, using the feed-forward clamping circuit described as "third preferred embodiment" or circuit described as "fourth preferred embodiment" with the purpose described in the present invention to clamp the feedback control voltage by means of diode $D_{clamp}$ and consequently limiting the volt-second product applied to the magnetic components over a wide range of input voltages.

Figure 13:
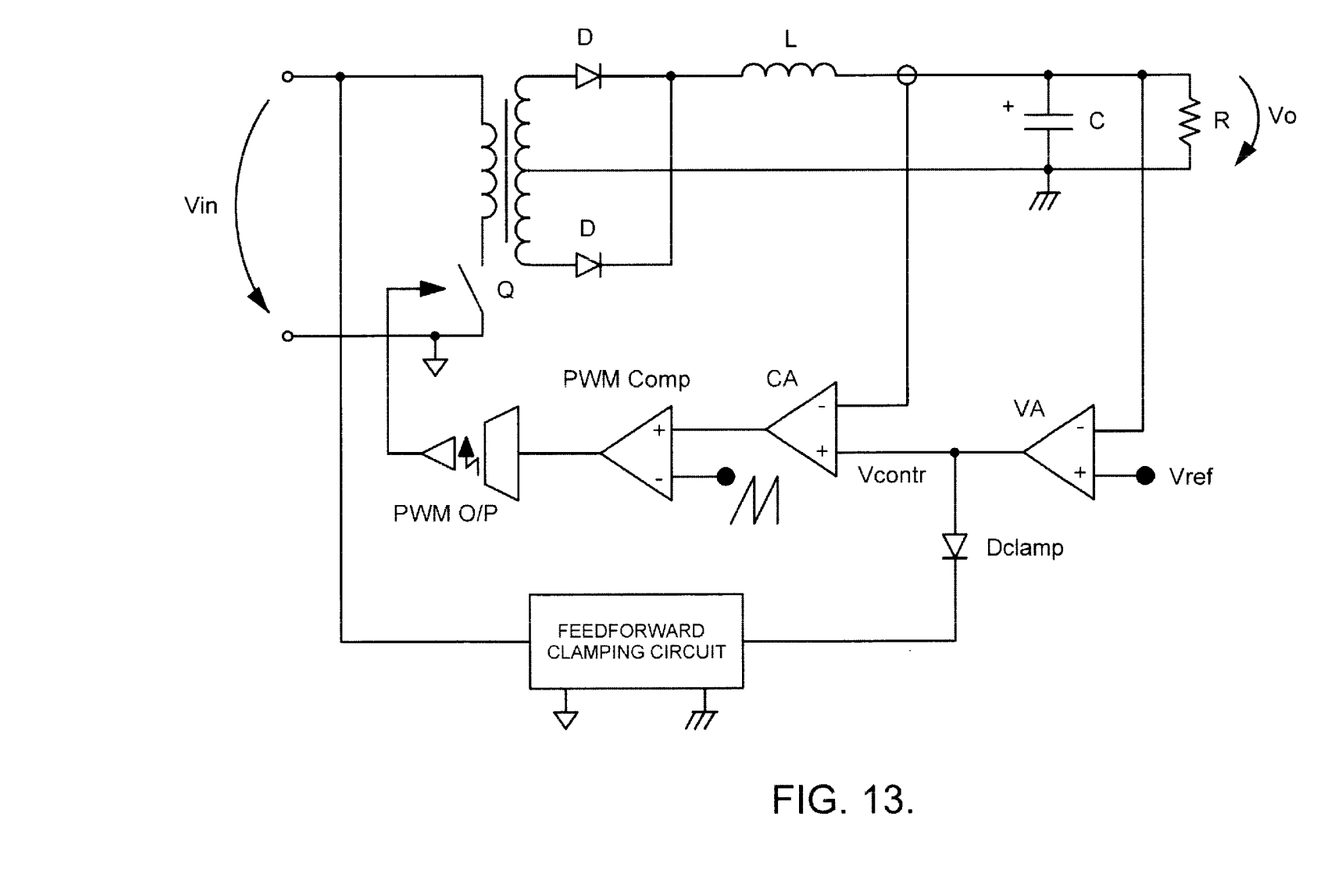
FIG. 13 is exemplifying where the third or fourth preferred embodiment will insert in the schematic of a typical isolated forward converter using average current-mode control.

FIG. 13 shows a typical isolated forward converter schematic, having average current mode control, using the feed-forward clamping circuit described as "third preferred embodiment" or circuit described as "fourth preferred embodiment" with the purpose described in the present invention to clamp the feedback control voltage by means of diode $D_{clamp}$ and consequently limiting the volt-second product applied to the magnetic components over a wide range of input voltages.

What I claim as my invention is:

1. In a non-isolated DC—DC converter, the method of preventing the inductor to saturate by limiting the volt-second product applied to the said inductor comprising the steps of:
   a) clamping the feedback control voltage; and
   b) decreasing the clamping level when the input voltage increases by subtracting a fraction of the input voltage from the said clamping level.

2. In a non-isolated DC—DC converter, the method of preventing the inductor to saturate by limiting the volt-second product applied to the said inductor comprising the steps of:

a) clamping the feedback control voltage; and b) decreasing the clamping level when the input voltage increases by dividing the said clamping level to a fraction of the input voltage.

3. In an isolated DC—DC converter, the method of preventing the transformer and/or inductor to saturate by limiting the volt-second product applied to the said transformer and/or inductor comprising the steps of:

a) clamping the feedback control voltage;

b) decreasing the clamping level when the input voltage increases by subtracting a fraction of the input voltage from the said clamping level; and c) using an isolation amplifier to comply to the isolation requirements.

4. In an isolated DC—DC converter, the method of preventing the transformer and/or inductor to saturate by limiting the volt-second product applied to the said transformer and/or inductor and comprising the steps of:

a) clamping the feedback control voltage;

b) decreasing the clamping level when the input voltage increases by dividing the said clamping level to a fraction of the input voltage; and c) using an isolation amplifier to comply to the isolation requirements.

* * * * *